United States Patent [19]
Voegtlin

[11] Patent Number: 5,619,911
[45] Date of Patent: Apr. 15, 1997

[54] OVEN FOR CONTINOUS BAKING OF BREAD, VIENNESE BREAD, PASTRY PRODUCTS AND THE LIKE

[75] Inventor: René Voegtlin, Oberhausbergen, France

[73] Assignee: Mecatherm, Schirmeck, France

[21] Appl. No.: 550,792

[22] Filed: Oct. 31, 1995

[30] Foreign Application Priority Data

Nov. 7, 1994 [FR] France .................. 94 13506

[51] Int. Cl.⁶ .............. A21B 1/46; A21B 1/24; A21D 8/00; A21C 11/00
[52] U.S. Cl. ............... 99/443 C; 99/386; 99/477; 126/21 A; 219/388; 219/400
[58] Field of Search .............. 99/360, 365, 367, 99/371, 386, 423, 427, 443 R, 443 C, 478, 479; 134/132; 219/388, 400; 126/21 A; 432/142, 152

[56] References Cited

U.S. PATENT DOCUMENTS

| | | | |
|---|---|---|---|
| 1,177,502 | 3/1916 | Ewald | 99/365 |
| 2,897,772 | 8/1959 | Hunter | 107/54 |
| 2,930,310 | 3/1960 | Poppenburg | 99/479 |
| 3,494,305 | 2/1970 | Pachyn | 99/427 |
| 3,802,832 | 4/1974 | Nicolaus | 432/128 |
| 3,830,624 | 8/1974 | Sperring et al. | 432/145 |
| 3,908,533 | 9/1975 | Fagerstrom et al. | 99/386 |
| 4,079,666 | 3/1978 | Plemons | 99/386 |
| 4,120,646 | 10/1978 | Groff et al. | 432/121 |
| 4,514,167 | 4/1985 | Royer | 99/443 C |
| 4,882,981 | 11/1989 | Bacigalupe | 99/479 |
| 5,109,758 | 5/1992 | Voegtlin | 99/443 C |

FOREIGN PATENT DOCUMENTS

| | | | |
|---|---|---|---|
| WO82/02475 | 8/1982 | WIPO | A21B 1/00 |
| WO90/06057 | 7/1990 | WIPO | A21B 1/42 |

*Primary Examiner*—Timothy F. Simone
*Attorney, Agent, or Firm*—Greenblum & Bernstein P.L.C.

[57] ABSTRACT

An oven for continuous baking of bread, Viennese bread, pastry products or the like includes of juxtaposable modules, each module including a baking chamber and conveying apparatus for holders, such as plates or racks, on which are arranged the products, for conveying same through the baking chamber, from an inlet opening to an outlet opening. The inlet opening of a baking chamber of a module is capable of coinciding with the outlet opening of a preceding module, these inlet and outlet openings being in the shape of slots. Each module includes a connecting arrangment surrounding this inlet opening and the outlet opening, which allow same to be made integral with the module preceding and/or following same. The conveying apparatus are partly defined by an intermittently operating noria on which are arranged the holders. These conveying apparatus of each module include, in addition, a transfer conveyer simultaneously extending under the descending column and under the ascending column of the noria, in order to allow, according to the case, the evacuation out of the baking chamber of the holder which is present at the bottom of the descending column or the direct evacuation of a holder which has not been taken over by the noria.

13 Claims, 2 Drawing Sheets

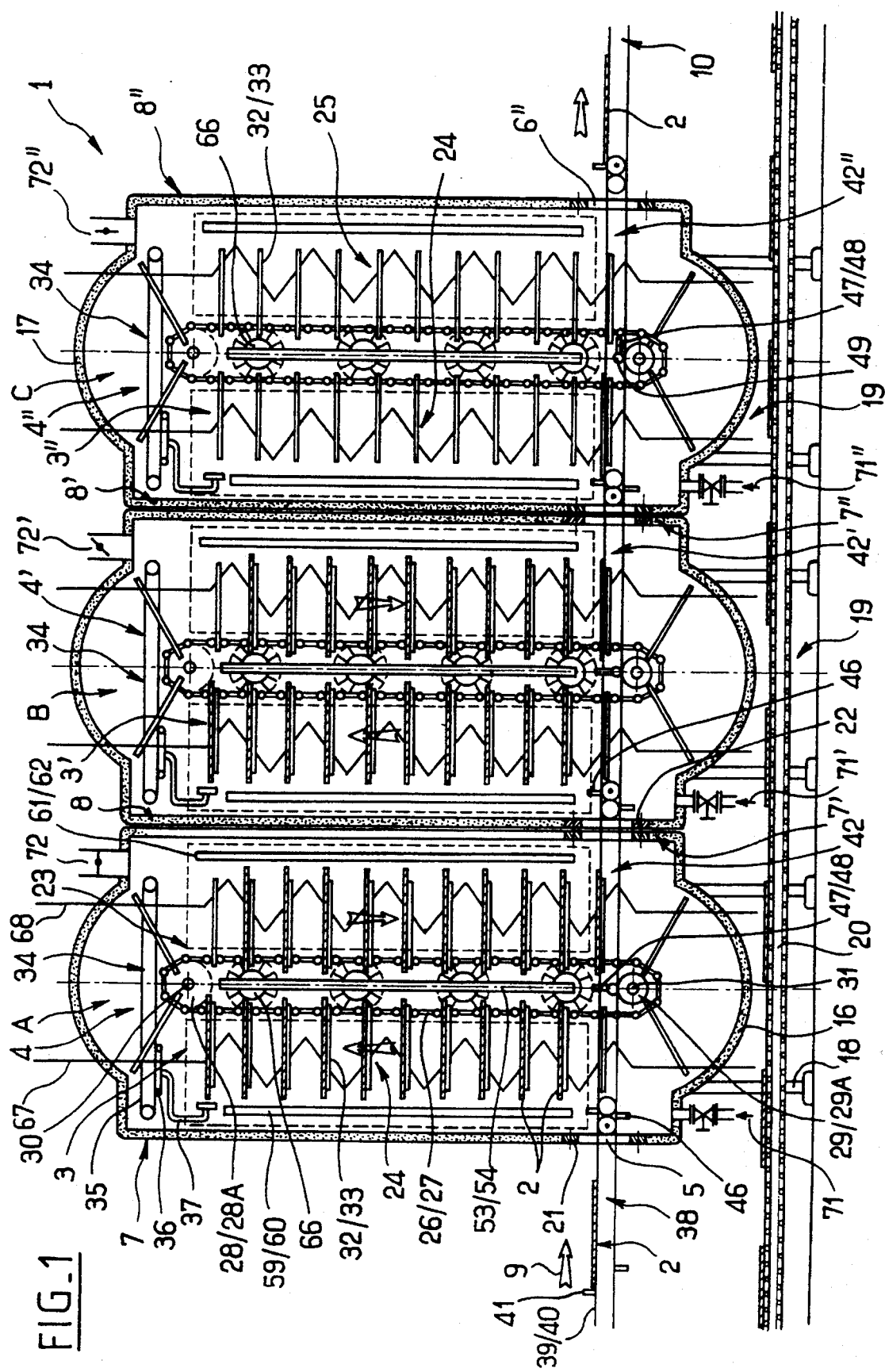
FIG_1

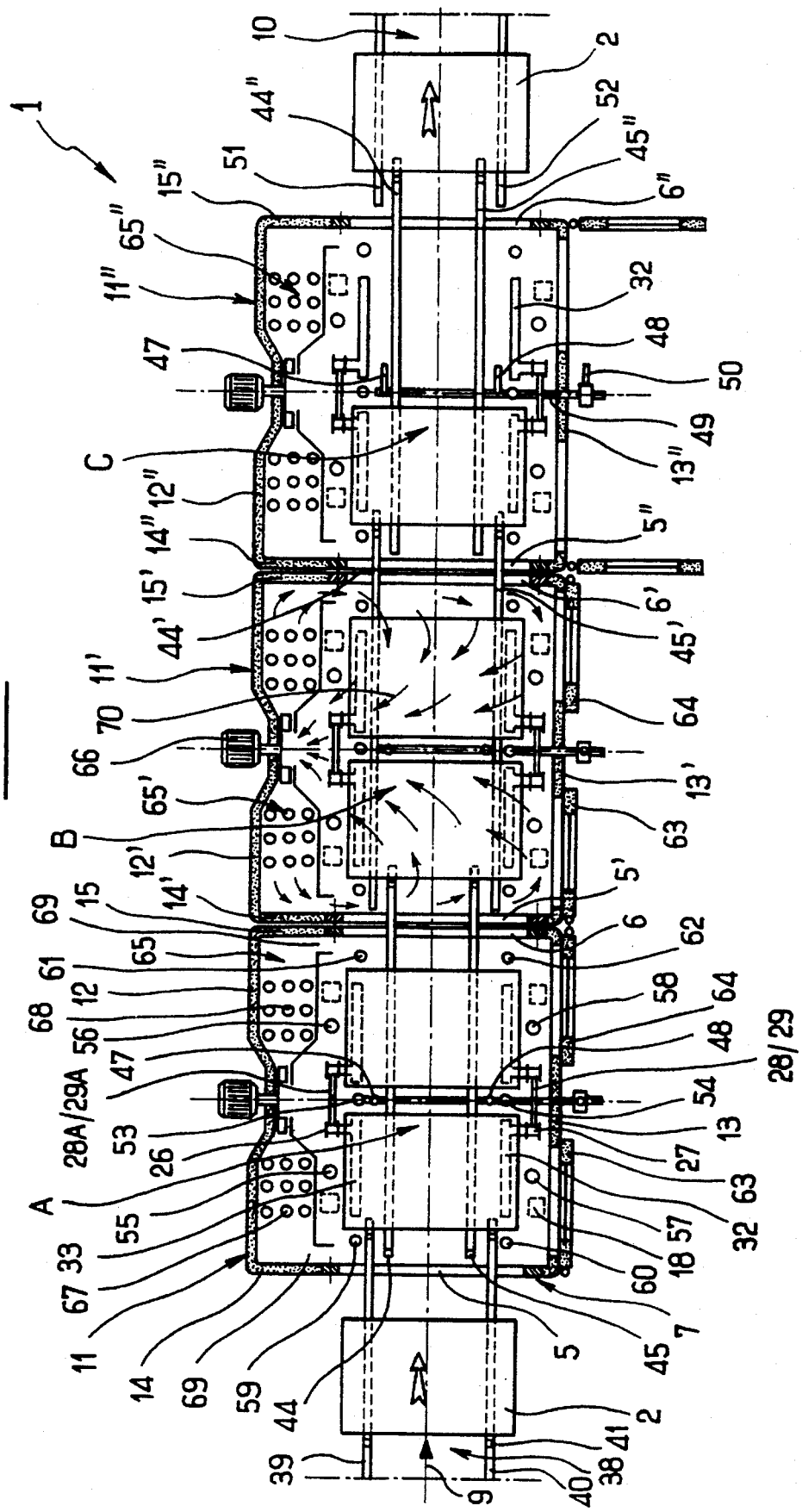
FIG_2

OVEN FOR CONTINOUS BAKING OF BREAD, VIENNESE BREAD, PASTRY PRODUCTS AND THE LIKE

BACKGROUND OF THE INVENTION (1) Field of the Invention

The invention relates to an oven for continuous baking of baked goods, such as bread, Viennese bread, pastry products and the like, comprising a baking chamber and conveying means for holders, such as plates, racks or the like, on which are arranged said products, these conveying means being capable of taking over these holders through the baking chamber, to convey them from an inlet opening to the outlet opening of same.

(2) Description of the Prior Art

In the field of industrial bakery, the equipment used should be capable of meeting increasingly higher production cycles. To this end, there have been developped ovens for continuous baking which, though being effectively capable of adapting themselves to the desired production speeds, have a number of drawbacks related to their size and weight.

As a matter of fact, such known ovens often include a parallelepipedically shaped insulating jacket inside which defines a baking chamber provided with an inlet opening and an outlet opening and through which pass conveying means which allow the conveying of the holders, such as plates, racks or the like, on which are arranged the products to be baked.

Thus, some ovens, called tunnel-ovens, include a linear baking chamber through which passes a conveyer on which are arranged the holders, such as plates or the like.

There are also known conveying means in the shape of one or several norias arranged inside the baking chamber. This or these norias are provided with brackets onto which are positioned said plates in order to ensure their transfer from the inlet opening to the outlet opening through imparting to same an upward and/or a downward motion inside said baking chamber. From this prior document is in particular known a noria comprised of a pair of motor-driven and juxtaposed chains describing a looped circuit and defining an upward chain side and a downward chain side. Furthermore, to these chains are perpendicularly secured brackets on which rest the plates with products to be baked. Because of this design, there are inside the oven a column of upwardly moving plates and a column of downwardly moving plates, it being known that, once it arrives at the upper end of the noria, a plate located on the ascending column is transferred onto the brackets of the descending column through appropiate transfer means.

These known ovens include large-capacity baking chambers, so that they are inevitably heavy and cumbersome, which presently means a lot of drawbacks.

Thus, in order to solve the problem of transport sizes and to avoid the use of very large handling devices or even simply for reasons of difficulty of access to the rooms where it will be used, the manufacturer is obliged to ship an oven for continuous baking as spare parts. Therefore, after having been delivered to the user, these spare parts must be assembled by a team of skilled installers. This results into mounting and commissioning sites for long periods, with, accordingly, an expensive immobilization of the equipment and the places of the future operation.

Such known large production-capacity ovens for continuous baking have, in addition, a number of drawbacks related to their lack of flexibility in use. In particular, because of the absence of compartmentation and control, it is difficult to efficiently separate the atmosphere at the beginning, at half-way and at the end of baking of the products. Now, for some products, it is necessary to modulate the parameters, such as temperature and humidity, according to whether the baking is in its initial or final phase. By way of an example, for making fully baked loaves, it is necessary to start baking in a high-temperature and steam-saturated atmosphere and the temperature and humidity should be decreasing at half-way, then at the end of the baking process. In comparison, for making only pre-baked loaves which are intended for being deep-frozen, there is required a lower, but rather constant temperature combined with a very high steam saturation inside the whole of the oven.

These known ovens for continuous baking are also incapable of adapting themselves to changes in production rhythm. Considering the above-mentioned example, there is required two to three times less time for pre-baking a product than for ensuring the full baking of the same product. Thus, assuming the shaping and trimming machines which precede the oven in a production line are used at full capacity for making fully baked loaves and this equipment cannot produce more pieces when turning to the manufacturing of pre-baked loaves, the oven for continuous baking will be half or up to two thirds empty, in order to meet, in this case, the baking time for these pre-baked loaves. In order to achieve a reduction of the baking time in an oven for continuous baking, the speed of the conveying means which convey the products from the inlet to the outlet of the oven is indeeed increased. As already stated above, for their baking, the bread, Viennese bread, pastry products or the like are arranged on holders, such as plates or racks. Now, since they are always supplied at the same rhythm by the machines located upstream, these plates or racks are farther separated from each other inside the oven when the aforementioned requirements have to be met, i.e. when the baking time has to be reduced by increasing the speed of the conveying means inside the oven. This generally results into an unevenness of baking of the products arranged on the plates, without taking into consideration that the complete oven has to be heated and supplied with steam, which is obviously not optimal as regards the energy consumption.

Another drawback of these known ovens for continuous baking resides in the almost impossible access to the products contained in the oven in the event of an unexpected stopping of the means ensuring the conveying of the products through this oven, e.g., due to an interruption of energy supply.

Finally, one should appreciate that because of the large size and the heavy weight of such ovens or because of the assembling structure or even because of the presence of a heating system installed in the lower portion, these ovens directly rest on the floor. Now, in the case of automatic production lines, this arrangement entails the looping of the conveying circuit for the baking holders, such as plates, racks or the like, either by passing above the oven or by turning around the latter, creating an additional occupation of the working room and, in some cases, impeding the free access to the side walls of the oven at which it often includes auxiliary devices or hatches for looking inside the oven.

SUMMARY OF THE INVENTION

This invention is aimed at coping with all the above-mentioned drawbacks. As a matter of fact, it is aimed at proposing a cellular oven comprised of juxtaposable modules, each module forming an elementary oven in that it includes a baking chamber and means for ensuring the conveying of the plates inside the latter, but also its own means for controlling the baking parameters.

Thus, the invention relates to an oven for continuous baking of bread, Viennese bread, pastry products or the like, comprising a baking chamber and conveying means for holders, such as plates, racks or the like, on which are arranged the products, for conveying them through the baking chamber, from an inlet opening to the outlet opening of same, wherein the inlet opening of a baking chamber of a module is capable of coinciding with the outlet opening of a preceding module, said inlet and outlet openings being in the shape of slots having minimal dimensions, in order to allow either to supply a module with holders or to transfer these holders from one module to another or even their feeding out at the outlet of the last module, each module includes connecting means surrounding the inlet opening and the outlet opening of the baking chamber, which allow same to be made integral with the module preceding and/or following same, said conveying means are partly defined by an intermittently operating noria on which can be arranged the holders whilst defining an ascending column and a descending column, at the upper end of this noria being provided means for transferring the holders having reached the upper end of the ascending column to the side of the descending column, said conveying means of each module including, in addition, a transfer conveyer simultaneously extending under the descending column of holders and under the ascending column of holders, in order to allow, according to the case, the evacuation out of the baking chamber of the holder which arrives at the bottom of the descending column or the direct evacuation of a holder which has been conveyed by a feed-in conveyer or a transfer conveyer from a preceding module and which has not been taken over by the noria due to the interruption of the operation of same.

According to another feature of the invention, each module includes its own means for controlling the temperature and the humidity prevailing inside its baking chamber.

In addition, each module advantageously rests on the floor through feet or an appropriate structure, keeping between this module and the floor a sufficient space for accommadating a looping circuit for the holders, such as plates, racks or the like, within the framework of an automated production line.

In addition, each module is provided, at its sides, with doors providing access to the baking room and, in particular, to all the holders arranged inside this latter, in order to facilitate their withdrawal.

The advantages resulting from this invention mainly consist in that each module can be completely mounted in the works by the manufacturer, then transported to the places of operation by means of transport means with normal sizes.

Furthermore, the test operation of each module can be previsouly performed at the works by the manufacturer, this for all the functions of heating, steam-intake, moisture-removal and mechanism of passing through of the baking bolders. In this way, the installation and commissioning operations on the site of use can be carried out very quickly. In particular, as regards the mounting, it is enough to juxtapose the modules according to the axis of conveying of the baking holders, then to make them integral with each other through appropriate connecting means.

In addition, since each module includes its own means for controlling the heating, the steam-intake and of moisture-removal, the oven thus made up of such modules has a perfect flexibility as regards its possibilities of adapting the atmosphere in which the products to be baked are moved, this at each baking stage of same. In particular, because of these modules, this oven is subdivided into compartments which communicate with each other only through openings reduced to a compulsory minimum to allow the transfer of the baking holders from one module into another. Thus, in each compartment, the baking parameters can be different.

In short, such an oven is perfectly adaptable to the various baking processes which require different ranges of temperature and humidity between the beginning and the end of the baking process.

It should also be appreciated that a module of an oven can be neutralized, at least as regards its heating, steam-intake and moisture-removing means. In this way, the contents of the oven can be adapted to the production rhythm and the baking conditions at the time being. This proves particularly appropriate when one wants to turn from a fully baked product to a pre-baked product requiring a shorter baking time, it being understood that the production rhythm in terms of the number of products and, accordingly, of the number of holders, such as plates, racks or the like, remains unchanged.

This way of proceeding avoids the necessity of accordingly increasing speed at which the holders pass through the modules and finally avoids creating empty spaces between these holders. In addition, by avoiding the necessary heating and moistening of a module, the operation of an oven is optimized from an energy-consumption point of view.

It should be noted that in such operation conditions it is possible to use the module or modules neutralized in heating and steam intake as cooling module for the products which have just been pre-baked in the first modules.

The invention has also a number of advantages as regards the size provided by such a modular oven. As a matter of fact, each module has per se a relatively reduced weight, compared to a known non-modular oven for continuous baking. Such a module can therefore rest on the floor through feet or an appropriate structure allowing to keep between the floor and the bottom of a module a sufficient space for looping the circuit for the holders, such as plates or the like, in the event of an automatic plant.

BRIEF DESCRIPTION OF THE DRAWINGS

The invention will be better understood when reading the description which follows, with reference to the drawing corresponding to one embodiment, in which:

FIG. 1 is a schematical elevational and cross-sectional view of an oven for continuous baking according to the invention and comprised of three modules, FIG. 2 is a schematical plan and cross-sectional view of an oven as shown in FIG. 1.

DESCRIPTION OF THE PREFERRED EMBODIMENTS

As can be seen in the Figures of the attached drawings, this invention relates to an oven 1 for continuous baking of bread, Viennese bread, pastry products and the like, these products being arranged on generally rectangularly shaped holders 2, such as plates, racks or the like.

According to the invention, this oven 1 is comprised of juxtaposable modules A, B, C, each of these modules including a baking chamber 3, 3', 3", as well as conveying means 4, 4', 4" which allow to convey the products arranged on the holders 2 through this baking chamber 3, 3', 3", from an inlet opening 5, 5', 5" to an outlet opening 6, 6', 6".

In addition, according to the invention, the inlet opening 5', 5" of a module B, C is capable of coinciding with the outlet opening 6, 6' of module A, B which precedes same and which is immediately juxtaposed to same. According to a preferred embodiment, these inlet and outlet openings 5, 6; 5', 6'; 5", 6" of a module A, B, C, respectively, are located on one and the same horizontal plane and at opposite sides 7, 8; 7', 8'; 7", 8" of the baking chamber 3, 3', 3". These sides 7, 8; 7', 8'; 7", 8" are furthermore perpendicular to the axis 9 along which the holders 2 pass through the oven 1.

Moreover, the conveying means 4, 4', 4" of a module A, B, C are so defined that they are capable of arranging the holders 2, at the outlet of the baking chamber 3, 3', 3", onto the conveying means 4, 4', 4" of the following and immediately juxtaposed module B, C. Of course, at the outlet of the last module C, the conveying means 4" arrange these holders 2 onto an appropriate feed-out conveyer 10.

Theoretically, an oven 1 can be comprised of an unlimited number of such modules A, B, C, the embodiment shown in the shape of three modules in the attached drawings being given only by way of an indicative and non-restrictive example. Practically, the number of these modules A, B, C varies from two to about ten, it being understood that it is determined according to the quantity of production contemplated, the baking time of the products in question, but also according to the sizes each of these modules can adopt, which sizes depend in particular on those of the working room intended for accommodating the oven 1. As will more clearly appear from the description which follows, it may be necessary to limit the height of the modules A, B, C according to the ceiling height available in the working rooms.

According to a preferred embodiment, a baking chamber 3, 3', 3" is limited by an insulating jacket 11, 11', 11" with a generally parallelepipedical cross-section including, on the one hand, two side walls 12, 12', 12" and 13, 13', 13", respectively, parallel to the axis 9 of passing through of the holders 2 and, on the other hand, two transversal vertical walls 14, 14', 14" and 15, 15', 15". These latter are therefore perpendicular to the axis 9 and respectively define the sides 7, 8; 7', 8'; 7", 8" of the baking chamber 3, 3', 3" including the inlet opening 5, 5', 5" and the outlet opening 6, 6', 6". This insulating jacket 11, 11', 11" is furthermore closed at its lower portion and at its upper end by a semicylindrically shaped bottom 16 and ceiling 17, respectively, and this for reasons which will be set forth later in the description.

Each module A, B, C advantageously rests on the floor through feet 18 or any bearing structure whatsoever which is in any case intended to provide a free space 19 between the bottom 16 and the floor allowing to install under these modules A, B, C a conveyer 20 for returning the holders 2 when the oven 1 is installed in an automated production circuit.

Each module A, B, C advantageously includes connecting means 21, 22 which allow same to be made integral with the module which precedes and/or follows same. Preferably, these connecting means 21, 22 are in the shape of flanges surrounding the inlet opening 5, 5', 5" and the outlet opening 6, 6', 6" of each of these modules A, B, C.

It should be appreciated that these inlet openings 5, 5', 5" and outlet openings 6, 6', 6" are advantageously in the shape of slots and have minimal dimensions, in order to allow either the supply of a module A, B, C with holders 2 or the transfer of these holders 2 from one module to the other or also their feeding-out at the outlet of the last or most downstream module C. This has the advantage of limiting as much as possible the communication between one module and another one.

According to the embodiment more particularly shown in FIGS. 1 and 2 of the attached drawings, the conveying means 4, 4', " of a module A, B, C are partly defined by an intermittently operating noria 23 on which can be arranged the holders 2 whilst defining an ascending column or path 24 and a descending column or path 25. According to a preferred embodiment, this noria 23 is comprised of a pair of chains 26, 27 arranged on both sides of the axis of passing through 9. Each of these chains 26, 27 partially extends around about two chain wheels 28, 29 or 28A, 29A, respectively, with horizontal rotation axis and located in one and the same vertical plane. As a matter of fact, in order to ensure the operation synchronism of the chains 26, 27, the wheels 28, 29 or 28A, 29A, respectively, are fitted on one and the same horizontal shaft 30, 31, respectively. It should be appreciated that one of these horizontal shafts, preferably the upper horizontal shaft 30, is coupled to a driving shaft passing through the side wall 12, 12', 12" of the insulating jacket 11, 11', 11" and cooperating with appropriate driving means which, for the sake of clearness of the drawings, have not been shown.

To each of these chains 26, 27 of the noria 23 are perpendicularly secured brackets 32, 33 and this with a regular distance between each other. In addition, to one bracket 32 of a chain 26 corresponds a bracket 33 of the chain 27, so that on two brackets 32, 33 located at one and the same height can horizontally rest a holder 2. It is just because of the presence of the noria 23 and the semicircular motion described by the brackets 32, 33 at its upper and lower ends that the bottom 16 and the ceiling 17 are semicylindrically shaped. Such a shape indeed allows the avoidance the presence of unnecessary areas inside the baking chamber 3, 3', 3".

Thus, the ascending column 24 of holders 2 is defined by all these holders 2 resting on the brackets 32, 33 located at one side of the noria 23 to which is imparted an ascending motion through the chains 26, 27, whilst the descending column 25 is defined by all the holders 2 resting on the brackets 32, 33 arranged at the other side of the noria 23.

In this respect, it should be appreciated that, in order to facilitate the access to the mechanism contributing to the loading and unloading of a noria 23 corresponding to a module A, B, C, the inlet openings 5, 5', 5" and outlet openings 6, 6', 6" are located in the lower portion of these modules A, B, C and, hence, of the noria 23. Thus, the holders 2 first describe an ascending motion, than a descending motion.

The conveying means 4, 4', " furthermore include means 34 for transferring the holders 2 having reached the upper end of the noria 23 and, hence, of the ascending column 24 to the side of the descending column 25. When the holder 2 reaches this upper end of the noria 23 or proximate the upper end as shown in FIG. 1, the noria is stopped, allowing the means 34, e.g. in the shape of a horizontal pusher comprised of a pair of chains 35 actuating, according to a back and forth motion, a slide 36 provided with pushers 37, to push the holder 2 from the brackets 32, 33 on which it rests and corresponding to the ascending column 24 onto the brackets 32, 33 arranged in the same horizontal plane and corresponding to the descending column 25.

It should be appreciated that during this period of standstill of the noria 23, a holder plate 2 is furthermore arranged on the waiting brackets 32, 33 located at the bottom of the ascending column 24, whilst the holder 2 resting on the bracket 32, 33 at the bottom of the descending column 25 is removed from the module A, B, C. At that time, the cycle starts anew, the noria 23 being put into motion until a holder 2 is once again present in front of the transfer means 34.

The loading of the oven is carried out by means of a feed-in conveyer 38 which penetrates into the baking chamber 3 of the first or most upstream module A, through its inlet opening 5, to place on the waiting brackets 32, 33 at the bottom of the noria 23 a holder 2 with products to be baked.

This feed-in conveyer 38 is preferably comprised of two parallel and substantially horizontally running chains 39, 40 on which are arranged holders 2. Each of these chains 39, 40 is provided with lugs 41 which, when the chains 39, 40 are put into motion, push a holder 2 onto the brackets 32, 33 into the inside of the baking chamber 3, in the conditions as mentioned above. Of course, like for the transfer means 34, the operation of this feed-in conveyer 38 is controlled when the noria 23 is stopped.

Finally, the conveying means 4, 4', 4" of each module A, B, C are completed by a transfer conveyer 42, 42', 42" which, when the noria 23 is stopped, is capable of removing from the baking chamber 3, 3', 3" the holder 2 which is at that very moment present at the bottom of the descending column 25. Such a transfer conveyer 42, 42', corresponding to a module A, B, furthermore acts as a feed-in conveyer for the next module B, C, respectively. By way of an example, a holder 2 taken off the bottom of the descending column 25 of the first module A, through the transfer conveyer 42, is arranged onto the brackets 32, 33 of the noria 23, at the bottom of the ascending column 24 of the next module B. Of course, the holders 2 taken off by the transfer conveyer 42" of the last module C are placed on the feed-out conveyer 10.

One can understand that the intermittent operation of the norias 23 is so synchronized that a holder 2 removed, at a given moment, from the baking chamber 3, 3' of a module A, B can immediately be placed on the noria 23 of the baking chamber 3', 3" corresponding to the next module B, C, respectively.

Like the feed-in conveyer 38, these transfer conveyers 42, 42', 42" are comprised of two parallel and substantially horizontally running chains 44, 44', 44"; 45, 45', 45" bearing lugs 46 through which they are capable of taking over a holder 2 with a view to removing same from a baking chamber 3, 3', 3" of a module A, B, C and to place same into a next module or onto the feed-out conveyer 10.

The chains 44, 44', 44"; 45, 45', 45" of a transfer conveyer 42, 42', 42" preferably extend not only under the descending column 25 of holders 2, but also under the ascending column 24. In this way, such a transfer conveyer 42, 42', 42" is capable of taking over a holder 2 which, having been inserted into a module A, B, C, has not been raised by the noria 23 because of the interruption of the operation of same. This holder 2 can, during the next operation cycle, in fact be removed by this transfer conveyer 42, 42', 42".

More particularly, with regard to the example of an oven 1 which, as shown in the attached drawings, is comprised of three modules A, B, C, foreseen, in the case of a normal production rhythm, for fully baking loaves which therefore require a given baking time, the use of this oven 1 for manufacturing pre-baked loaves can occur by simply neutralizing one or several modules B, C, this in particular according to the time necessary for pre-baking these loaves.

Thus, it is not necessary to accelerate the mechanism of operation of the conveying means 4, 4', 4" of the modules A, B, C to shorten the baking time, which, for a given production rhythm, would unavoidably lead to the separation of the holders 2 inside the oven 1 and, hence, to a bad evenness of baking of the products.

Furthermore, by avoiding the heating of all the modules A, B, C of the oven 1, its operation is obviously optimized from an energy-consumption point of view.

It should furthermore be appreciated that some of these modules A, B, C can be neutralized only as regards their heating, steam-production and further moisture-control means. By way of an example, by keeping the conveying means 4" of the unheated module C in operation, this latter can act as a cooling module for the products which have just been pre-baked in the first two modules A, B.

It should be appreciated that in order to impede the holders 2 from penetrating farther than appropriate into the baking chamber 3, 3', 3", under the impulsion of a feed-in conveyer 38 or a transfer conveyer 42, 42', thrust blocks 47, 48 are provided for this purpose at the bottom of the noria 23. Such thrust blocks are however of a withdrawable kind, this for the purpose as mentioned above. Viz., in the event of a full neutralizing of a module C, the transfer conveyer 42" should be capable of pushing directly out of this module C the holder 2 which, during a previous cycle, has been inserted into its baking chamber 3" by the transfer conveyer 42' of a module B located upstream. Thus, these thrust blocs 47, 48 are capable of being tilted into a horizontal position through a transverse axis 48 actuatable from outside the baking chamber 3, 3', 3" by means of a handle 50.

In order to ensure a smooth transition of the holders 2 from a feed-in conveyer 38 onto a transfer conveyer 42 or even from a transfer conveyer 42, 42', 42" onto a following one and, of course, at the outlet of the last module C, from the transfer conveyer 42" onto the feed-out conveyer 10, the chains 39, 40; 44, 45; 44', 45'; 44", 45", 51, 52 of these various conveyers 38, 42, 42', 42" and 10, respectively, penetrate into each other. Thus, the chains e.g. 39, 40 of a conveyer, in this case the feed-in conveyer 38, are substantially farther separated from each other than the chains 44, 45 of the next transfer conveyer 42. Then, the chains 44', 45' of the transfer conveyer 42' are, in turn, farther separated from each other, and so on.

Each module A, B, C also includes a number of guiding means, in order to correctly guide the ascending column 24 of holders 2 and the descending column 25 of holders 2 arranged on a noria 23.

Thus, there are central vertical guides 53, 54 ensuring the correct separation between the ascending column 24 and the descending column 25 of these holders 2, whilst the vertical side guides 55, 56 or 57, 58, respectively, ensure their lateral guiding.

Finally, vertical rising guides 59, 60 and vertical lowering guides 61, 62 arranged on both sides of the noria 23, in the conveying direction of the holders 2, ensure the maintaining of same on their respective brackets 32, 33 during the upward and downward movement.

Advantageously, one side wall 13, 13', 13" of the insulating jacket 11, 11', 11", defining the baking chamber 3, 3', 3", includes at least one access door 63 which, in the event of an unexpected interruption of the operation of a module A, B, C, e.g. in the event of an interruption of power-supply, allows the removal from same the holders 2 arranged on the noria. As a matter of fact, each of these modules A, B, C preferably includes, at the level of the side wall 13, 13', 13", two access doors 63, 64 each of which provides access to a column 24, 25 of holders 2.

It should be appreciated that the vertical side guides 54, 58 located on the side of these access doors 63, 64 are of a withdrawable kind, in particular in order to allow the withdrawal the holders 2 arranged on the brackets 32, 33. Likewise, the vertical guides for the upward movement 59, 60 and for the downward movement 61, 62 may also be withdrawable or tilting, in order to facilitate this operation. Advantageously, each module A, B, C includes its own control means for the temperature and the humidity prevailing inside its baking chamber 3, 3', 3". Thus, each module A, B, C includes its individual heating system 65, 65', 65" which is preferably arranged between the side wall 12, 12', 12" opposite the one including the access doors 63, 64 and the mechanism of the conveying means 4, 4', 4" mainly represented by the noria 23.

These heating systems 65, 65', 65" operate by means of recycling of hot air. Thus, in the embodiment shown, each module A, B, C includes one or several motor-driven turbines 66, here four in number, which intake air from the baking chamber 3, 3', 3", in order to ensure the passage of same over heating means 67, 68. In this respect, these latter have been shown in FIG. 2 by means of bundles of electric resistances, whilst they have been schematically shown in FIG. 1 by means of zigzag lines. Of course, these bundles of electric resistances can be replaced by other types of heating means. Viz., exchangers heated by a liquid or gas-fuel burner can also be used.

The hot air is then directed towards the vertical slots 69 located at the front and the rear of each module A, B, C, in order to be blown between the holders 2 forming the ascending column 24 and the descending column 25. The sweeping of the products arranged on these holders 2 then occurs according to the arrows 70 which can be seen, in particular, at the level of module B in FIG. 2.

As already mentioned above, the number of motor-driven turbines 66 mainly varies according to the height of the modules A, B, C and therefore according to the number of holders 2 contained in the ascending and descending column 24, 25.

For an individual control of the temperature inside the baking chamber 3, 3', 3" of each module A, B, C, each of the heating systems 65, 65', 65" has its individual thermostatical control, so that it is possible to control the temperature curve during the baking through this oven 1. It should be appreciated that such a heating system 65, 65', 65", which is independent for each module A, B, C, allows in particular to neutralize one or several of them, with a view to reduce the baking time for the products and, in particular, in the event the operation of the conveying means 4, 4', 4" of one of these modules A, B, C, has been switched off.

The heating systems 65, 65', 65" of each module A, B, C are preferably arranged at one and the same side with respect to the axis 9 of conveying of the holders 2, which, on the one hand, makes easier the access to the auxiliary devices of these heating systems. On the other hand, this arrangement is advantageous, provided the access doors 63, 64 of these modules A, B, C are, under such circumstances, also arranged at one and the same lateral side of the oven 1.

Since each module A, B, C includes individual control means for the temperature, but also for the humidity prevailing inside its baking chamber 3, 3', 3", the modules A, B, C include, at their lower portion, a steam inlet 71, 71', 71". In this respect, in the case the steam inlets 71, 71', 71" being connected to a general steam-supply network, each module A, B, C is supplied with steam through an individual control valve, so that the desired steam-saturation specific to each module A, B, C can be chosen.

As a variant, the steam inlet 71, 71', 71" of these modules A, B, C may be connected to a small individual steam generator for each module. In this case, the individual control of these small generators can replace the use of a control valve.

In the upper portion of each module A, B, C, there is also a controllable moisture outlet 72, 72', 72". In this way, the evacuation of the moisture released by the products being baked in the modules A, B, C can be controlled as desired and an adaptation to the desired baking process is thus possible.

The advantages resulting from this invention are of course a large adaptability of such a modular oven for continuous baking to the various baking conditions which occur. In particular, in the case of manufacturing of a product with a reduced baking time, it is possible to neutralize one or several modules of which the oven for continuous baking is and the operation of this oven can thus be optimized from an energy-consumption point of view, but also as far as the evenness of baking of the products is concerned.

In these circumstances, this invention represents a clear progress with respect to the state of the prior technique.

What is claimed:

1. An oven for continuous baking of baked goods, said oven comprising:
    (A) a plurality of juxtaposed modules, each of said modules comprising:
        (1) a baking chamber, said baking chamber having an inlet opening and an outlet opening;
        (2) a plurality of holders for holding the baked goods thereon;
        (3) means for conveying said plurality of holders within said baking chamber from a position proximate said inlet opening to a position proximate said outlet opening, said means for conveying comprising:
            (a) a noria, said plurality of holders being arranged on said noria, said noria comprising an ascending path and a descending path, each of said ascending path and said descending path comprising an upper end and a lower end;
            (b) means for intermittently driving said noria within said baking chamber;
            (c) means for transferring holders from a location proximate the upper end of the ascending path of said noria to a location proximate the upper end of the descending path of said noria;
            (d) a transfer conveyor simultaneously extending under said ascending path of holders and under said descending path of holders;
    (B) a said inlet opening of said plurality of modules being dimensioned and positioned to coincide with a respective one of a said outlet opening of a preceding one of said plurality of juxtaposed modules, said inlet openings and said outlet openings having minimal dimensions to enable supplying a said module with said holders, to enable transferring said holders from a said module to another said module and to enable feeding out said holders at said outlet opening of a most downstream module;
    (C) means surrounding said inlet openings and said outlet openings of said modules for connecting each said module to be integral with a preceding and/or following module of said plurality of juxtaposed modules; and (D) a feed-in conveyor for feeding said holders to said inlet opening of a most upstream module for enabling said holders to be taken over by said means for conveying said holders within said baking chamber of said most upstream module;

wherein said transfer conveyor of each of said modules is configured and arranged to selectively:

receive holders from said noria at the bottom of said descending path of said noria of a given module and to evacuate said holders from said baking chamber of said given module; and receive holders from said feed-in conveyor, or from an upstream transfer conveyor of a juxtaposed module, and to evacuate said holders from said baking chamber of said given module without being conveyed by said noria of said given module.

2. An oven in accordance with claim 1, wherein:

said infeed conveyor and said transfer conveyors define a direction of motion for said holders through the oven; and said baking chamber of each of said modules is limited by an insulating jacket, said insulating jacket having a generally parallelepipedical cross section including a pair of opposite side walls, generally parallel to said direction of motion, and a pair of opposite transverse walls, generally perpendicular to said direction of motion, said inlet opening and said outlet opening of said modules extending through respective ones of said transverse walls, said insulating jacket further comprising a lower portion having a semi-cylindrical shape and an upper end having a semi-cylindrical shape.

3. An oven in accordance with claim 2, each of said modules further comprising:

at least one access door in at least one of said side walls.

4. An oven in accordance with claim 3, each of said modules further comprising:

on one of said side walls a first access door for providing access to said ascending path of holders and a second access door for providing access to said descending path of holders.

5. An oven in accordance with claim 1, wherein:

each of said modules comprise a bearing structure for defining a free space between a lower external portion of each said module and a floor surface, said free space being adapted to receive a further conveyor for returning holders in an automated production circuit.

6. An oven in accordance with claim 5, further comprising:

said further conveyor.

7. An oven in accordance with claim 1, wherein:

each of said modules comprises a lower portion, each of said inlet opening and each said outlet opening is located in a lower portion of a respective one of said modules, all of said inlet openings and all of said outlet openings of said modules are located in a common substantially horizontal plane.

8. An oven in accordance with claim 1, wherein:

each said transfer conveyor comprises a pair of chains bearing lugs.

9. An oven in accordance with claim 1, further comprising:

thrust blocks positioned in each of said modules for limiting the extent of insertion of individual ones of said holders conveyed either by said feed-in conveyor or by said means for conveying of an upstream one of said modules and for enabling said noria to take over conveying of said holders; and means for selectively withdrawing said thrust blocks from a blocking position for allowing said transfer conveyor to directly remove said holders from said baking chamber.

10. An oven in accordance with claim 1, further comprising:

a feed-out conveyor for receiving said holders from said outlet opening of a most downstream module;

wherein adjacent ones of said feed-in conveyor, said transfer conveyor of each said module, and said feed-out conveyor are configured and arranged to penetrating into each other for ensuring a smooth transition for said holders from one said conveyor to another said conveyor.

11. An oven in accordance with claim 1, further comprising:

means for guiding said holders along said ascending path of said noria and along said descending path of said noria.

12. An oven in accordance with claim 1, wherein each of said modules further comprises:

an individual thermostatically controlled heating system;

a steam inlet for supplying steam through an individual control valve or an individual steam generator; and a controllable moisture outlet positioned in an upper portion of each said module.

13. An oven in accordance with claim 1, wherein:

said infeed conveyor and said transfer conveyors define a direction of motion for said holders through the oven; and said baking chamber of each of said modules is limited by an insulating jacket comprising a pair of opposite side walls, extending generally parallel to said direction of motion;

one of said pair of opposite side walls of each of said modules includes an access door for gaining access to said noria within said baking chamber; and an individual heating means positioned between the other of said pair of opposite side walls of each of said modules and said noria.

* * * * *